United States Patent [19]

Haering et al.

[11] 4,245,017
[45] Jan. 13, 1981

[54] BATTERY CATHODE AND METHOD

[76] Inventors: Rudolph R. Haering, 647 Croydon Pl., Vancouver, British Columbia, Canada; James A. R. Stiles, 4133 Fairway Pl., North Vancouver, British Columbia, Canada; Klaus Brandt, 318, 1741 W. 10th Ave., Vancouver, British Columbia, Canada

[21] Appl. No.: 33,718

[22] Filed: Apr. 26, 1979

Related U.S. Application Data

[63] Continuation-in-part of Ser. No. 935,361, Aug. 21, 1978, abandoned.

[51] Int. Cl.³ .................. H01M 4/04; H01M 4/36
[52] U.S. Cl. ............................ 429/218; 427/226
[58] Field of Search ............... 429/218, 233, 245; 427/58, 226, 227, 228

[56] References Cited

U.S. PATENT DOCUMENTS

| | | | |
|---|---|---|---|
| 2,905,574 | 9/1959 | Spengler et al. | 427/226 |
| 3,047,419 | 6/1962 | Yntema et al. | 427/226 |
| 3,475,161 | 10/1969 | Ramirez | 427/226 |
| 4,009,052 | 2/1977 | Whittingham | 429/218 |

FOREIGN PATENT DOCUMENTS

| | | |
|---|---|---|
| 910361 | 11/1962 | United Kingdom . |
| 1176633 | 7/1970 | United Kingdom . |
| 1321295 | 6/1973 | United Kingdom . |

*Primary Examiner*—Donald L. Walton

[57] ABSTRACT

A method for producing electrodes for use in secondary cells. A suspension in oil of fine particles of electrode material is applied as a film to a metal foil substrate which is then baked in an inert atmosphere at temperatures high enough to drive off the oil yet below the melting point of the metal foil substrate. Oxygen is introduced to the baking atmosphere at selected times to slightly oxidize or carbonize the electrode material. The preferred electrode material is molybdenum disulphide and the invention is chiefly applicable to the fabrication of molybdenum disulphide battery cathodes on aluminum foil.

19 Claims, 1 Drawing Figure

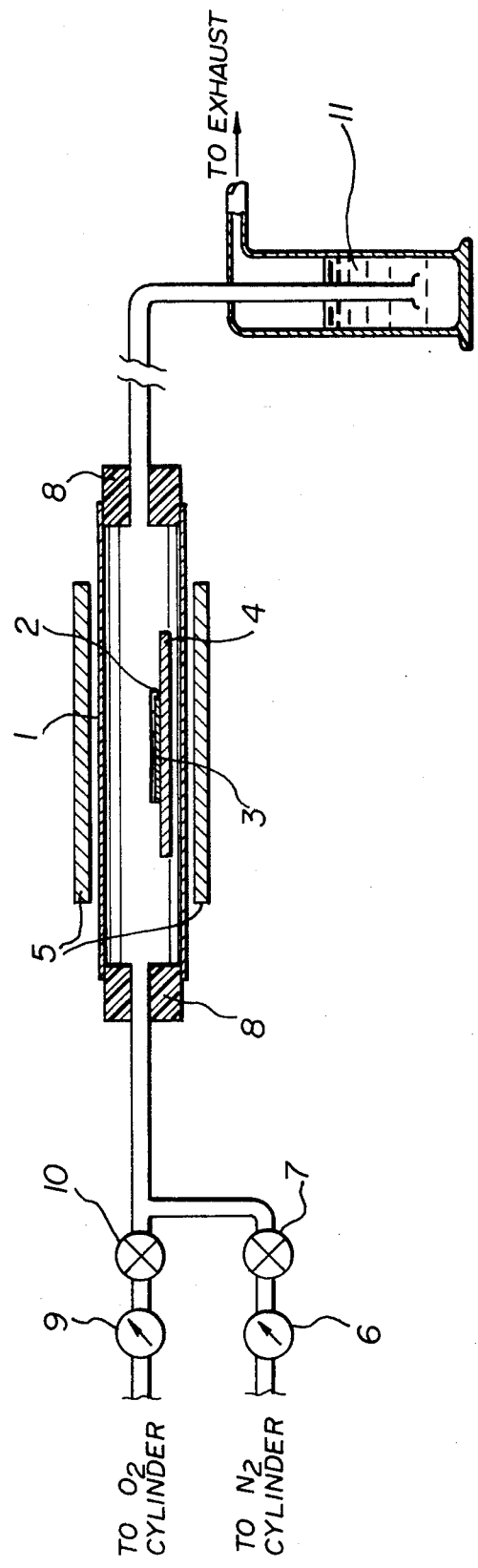

BATTERY CATHODE AND METHOD

This application is a continuation-in-part of application Ser. No. 935,361, filed on Aug. 21, 1978 now abandoned.

FIELD OF THE INVENTION

This invention relates to a method of preparing cathodes for use in secondary cells ("batteries") and has particular application to cathodes to be fabricated from a transition metal chalcogenide, especially $MoS_2$. Cathodes prepared according to the method of the invention exhibit high reversibility and excellent discharge current capabilities when incorporated in batteries having lithium anodes.

DESCRIPTION OF THE PRIOR ART

It is well known to produce a coating on a metallic substrate by painting a mixture of the coating material dissolved or suspended in a binder onto the substrate to be coated and then heating to decompose the binder leaving the coating material adherent to the substrate.

U.S. Pat. No. 2,819,962 teaches a method of producing sintered plates for galvanic cells by preparing a suspension of metallic powder having intercalating properties in water in which a viscosity-increasing agent has been dissolved. The substrate to be coated is dipped in the suspension, the thickness of the coating so obtained is adjusted and then the substrate is heated to dry the coating. The coated substrate is then sintered in a non-oxidizing atmosphere and cut into individual cell plates.

According to U.S. Pat. No. 2,905,574 a surface coating of $MoS_2$ may be obtained by coating the surface with a saturated ammoniacal solution of monomethylammonium tetrathiomolybdate and then heating to 480° C. in a stream of nitrogen.

U.S. Pat. No. 3,047,419 teaches a method of producing a corrosion-resistant silicide coating on titanium by painting the titanium to be coated with a carrier liquid in which an organic binder has been dissolved and in which fine particles of silicon and titanium are suspended. The coated body is dried, then heated in an inert atmosphere to decompose and vaporize the binder and sinter the silicon to leave a silicon-titanium alloy coating.

Selected transition metal chalcogenides have been used successfully as battery cathodes (see for example U.S. Pat. No. 4,009,052). However, battery cathodes produced according to the prior art usually incorporate relatively expensive materials. It is an object of the present invention to facilitate the production of a battery cathode from relatively inexpensive naturally-occuring or readily available materials while achieving a high degree of reversibility and discharge rate capability in the completed battery.

SUMMARY OF THE INVENTION

The present invention relates to an improved technique for the fabrication of battery cathodes and has particular application to the fabrication of a predominantly transition metal chalcogenide cathode on a metal foil substrate. The preferred transition metal chalcogenide is molybdenum disulphide ($MoS_2$—which the inventors believe to be the only naturally-occuring transition metal chalcogenide) and the preferred metal foil substrate is aluminum foil which is relatively inexpensive and readily available.

According to the invention, a suspension in oil of finely divided particles of cathode material is applied as a film to a metal foil substrate. The substrate with the applied film is then baked in an inert atmosphere which is preferably flowing past the substrate. The suspension is oxidized or carbonized by the admission to the baking atmosphere at selected times of oxygen which is preferably allowed to flow past the substrate at a controlled rate for a specific time which depends upon the substrate size. The substrate is then allowed to cool in an oxygen-free flow of inert gas.

DESCRIPTION OF THE DRAWING

The FIGURE is a cross-sectional front view showing a typical tube furnace having installed a quartz tube containing a quartz heat sink slab bearing a glass slide on which the foil substrate with applied film to be baked is mounted. Also shown are baking atmosphere inlet and exhaust ports.

DESCRIPTION OF THE PREFERRED EMBODIMENT

A predominantly transition metal chalcogenide cathode is prepared by first grinding the selected transition metal chalcogenide in oil to produce a suspension in oil of transition metal chalcogenide particles having an average diameter of about 1 micron. The actual grinding may be avoided by the use of commercially available compounds which consist essentially of a suspension of finely divided transition metal chalcogenide particles in oil. Any oil having a viscosity sufficiently high to allow handling of a substrate coated with the oil without significant loss of oil from the substrate surface will suffice. The inventors suggest the use of SAE 80 lubricating oil. Other organic materials such as glycerine or mineral oil may also be used.

A metal foil strip which is to act as a substrate to receive a coating of the selected transition metal chalcogenide is first annealed by baking the foil strip in an inert atmosphere at about 590° C. for approximately 20 minutes. Once the metal foil strip has cooled to room temperature the prepared suspension of transition metal chalcogenide in oil is applied as a film to the substrate. Any metal or metal alloy is suitable for use as a substrate provided that it does not react with the selected transition metal chalcogenide to produce deleterious side effects. Preferred substrate materials are aluminum, stainless steel, or nickel. The inventors have found aluminum foil as used for ordinary household purposes is quite acceptable as a substrate on which a coating of $MoS_2$ may be produced according to the method of the invention. The film may be applied to either one or both faces of the substrate. If the film is applied to only one face of the substrate then the substrate may be placed (with the opposite face in contact) on a slab of material such as quartz which acts as a heat sink during the baking procedure hereinafter described.

The inventors have found it convenient to use as a substrate a strip of aluminum foil having a width approximately equal to the width of a standard microscope slide and having a length slightly greater than the length of a standard microscope slide. One of the narrower ends of the aluminum strip is bent around one of the narrower ends of a standard microscope slide. The aluminum foil strip thus mounted on a microscope slide is easy to handle in subsequent steps of cathode preparation. The inventors advise against bending both ends of the aluminum foil strip around corresponding ends of the microscope slide because glass and aluminum have different coefficients of thermal expansion which might result in buckling during baking of an aluminum strip so mounted. If the prepared suspension is applied as a film to both faces of the substrate, the substrate should preferably be suspended so as to permit a free flow of the baking atmosphere past both substrate faces.

The substrate with the applied film is placed on the heat sink slab (or suspended) in a closed tube made from a heat-resistant material such as quartz and an inert gas is then caused to flow through the tube and past the sample. Purified nitrogen and argon have both proven to be acceptable for use as the inert gas. It is expected that helium would also perform satisfactorily. The inert gas flow rate is adjusted such that it is fast enough to prevent a backflow of air into the tube through the tube gas outlet port but also slow enough to prevent cooling of the substrate due to the flow of inert gas past the substrate.

The FIGURE illustrates a quartz tube 1 having single-hole neoprene stoppers 8 inserted in both ends. The substrate 2 with the applied film is mounted on a microscope slide 3 which rests on a heat sink slab 4. The heat sink slab, microscope slide and substrate with the applied film are inserted in the quartz tube 1 which is then placed in a standard Lindberg tube furnace 5 which has been preheated to a temperature below the melting point of the metal substrate. The range of 575° C.–590° C. is a preferred temperature range. This range is sufficiently high to evaporate the oil, and to permit oxidization and carbonization as described hereinafter to occur over a reasonably short period of time. Also, it is below the melting point (about 650°) of the preferred substrate, aluminum. Further, at temperatures much above the preferred range (viz. 625° C.), there appears to be a tendency in the presence of oxygen for unwanted oxides of molybdenum to form - but it is believed that this may be dependent upon and controllable by control of oxygen concentration. The furnace temperature must be high enough to drive substantially all of the oil off the substrate. The inert gas flow is maintained at the fixed rate described above, with the aid of the flowmeter 6 and the needle valve regulator 7. Gases which have flowed through the quartz tube 1 may be passed through bubbler apparatus 11 to assist in preventing a backflow of air into the quartz tube 1. Analysis of the pH of the liquid contained in the bubbler apparatus 11 will assist in determining the nature of the reaction which takes place in the quartz tube 1. The time required to drive off substantially all of the oil depends upon the size of heat sink slab used since the heat sink slab size will govern the time required for the substrate to reach thermal equilibrium in the pre-heated furnace. The inventors used a quartz heat sink slab measuring about 15 cm×4 cm×0.5 cm which required about 10 minutes to reach thermal equilibrium in the pre-heated furnace, after which time substantially all of the oil had been driven off the substrate.

While the substrate is being baked, oxygen is admitted to the closed tube 1 containing the substrate and caused to flow with the aid of flowmeter 9 and needle valve regulator 10, past the substrate at a rate dependent upon the size of the substrate, as hereinafter described. The inventors have found that the introduction of oxygen greatly enhances the ability of the transition metal chalcogenide coating to adhere to the substrate. The inventors believe that the discharge rate capability of a battery constructed using a cathode produced according to the method of the invention is significantly improved when oxygen is introduced to the baking atmosphere in the manner prescribed by the inventors. The inventors have found that cathodes prepared according to method of the invention are highly porous. Porosity is thought by the inventors to be a factor which enhances the intercalation of cations into the cathode during battery discharge with a resultant improvement in discharge rate capability of the battery.

The inventors have found that if the admission of oxygen to the baking atmosphere is delayed until after substantially all of the oil has been driven off the substrate, then the resultant cathode coating will contain both $MoS_2$ and an amount of $MoO_2$ dependent upon the volume of oxygen used and the time period for which the substrate with applied film is exposed to the oxygen. However, if oxygen is admitted to the baking atmosphere before substantially all of the oil has been driven off the substrate, then the resultant cathode coating will contain both $MoS_2$ and an amount of carbon, again dependent upon the volume of oxygen used and the time period for which the substrate with applied film is exposed to the oxygen. The formation of carbon is believed to result from the reaction of oxygen with the tars in the oil. In the latter process, some $MoS_2$ may also be converted to $MoO_2$. Thus, oxidized, carbonized, or oxidized and carbonized cathodes may be produced according to the method of the invention, all of which cathodes exhibit excellent reversibility and discharge rate capabilities as indicated in the examples to follow.

If the oxygen-inert gas mixture-flow rate is too low, an oxygen concentration gradient will be set up along the length of the substrate such that more oxygen will react with the suspension film at the end of the substrate closest to the source of the oxygen flow than will react with the suspension film at the end of the substrate farthest from the source of the oxygen flow. The oxygen-inert gas mixture flow rate must therefore be adjusted to minimize the effect of any such oxygen concentration gradient by preventing oxygen from diffusing radially downward to the substrate to replenish oxygen lost by reaction with the suspension film.

While oxygen is admitted, the furnace temperature and inert gas flow rate remain fixed at the same levels to which they were adjusted immediately prior to the placement in the furnace of the closed tube containing the substrate with applied film.

The problem of the oxygen concentration gradient and the resultant requirement for careful control over the oxygen flow rate may be overcome by adapting the method of the invention to the production of a continuous cathode by moving a continuous strip of substrate with applied film past a stationary oxygen source which bathes the moving strip in oxygen for a time period dependent upon the rate at which the strip is moving. The inventors believe that production of cathodes by such a moving strip method will result in an economically viable means for mass production of cathodes in accordance with the method of the invention.

Where $MoS_2$ is selected as the transition metal chalcogenide, and if the admission of oxygen to the baking atmosphere is delayed until after substantially all of the oil has been driven off the substrate, then the oxygen flow rate is held constant for a time period sufficient to allow between about 5 mole percent and about 50 mole percent of the $MoS_2$ to be converted to $MoO_2$. In preparation of carbonized cathodes by the introduction of oxygen to the baking atmosphere before substantially all of the oil is driven off the substrate, the oxygen flow rate is held constant for a time period sufficient to produce a cathode coating containing between about 5 weight percent and about 15 weight percent carbon.

Once the substrate has been sufficiently oxidized or carbonized, the tube containing the substrate is removed from the furnace and allowed to cool to room temperature with the inert gas flow rate held constant as before. The completed cathode is then removed from the tube.

The following examples are provided to give those skilled in the art a better understanding of the invention:

EXAMPLE 1

A cathode was constructed by coating oxidized $MoS_2$ onto an aluminum foil strip measuring 2.5 cm $\times$ 7.5 cm $\times$ 20 microns as follows:
(a) The aluminum substrate was baked at 590° C. in a purified nitrogen atomosphere for 20 minutes.
(b) After the foil cooled a suspension of 10% by weight $MoS_2$ in heavy lubricating oil was applied to the foil as a film. The average $MoS_2$ particle diameter was 0.25 microns. The foil substrate with applied film was placed on a quartz slab measuring 15 cm $\times$ 4 cm $\times$ 0.5 cm.
(c) The foil substrate with applied film and slab were placed in a quartz tube having a 2 inch diameter. Nitrogen was caused to flow through the tube at 800 cc/min.
(d) When the gas flow through the tube had stabilized, the tube was inserted in a furnace which has been preheated to 590° C.
(e) About 10 minutes after the tube was placed in the furnace, the foil had heated up to the nominal furnace temperature and substantially all of the oil had been driven off the foil. After this time, oxygen was caused to flow through the tube at 0.2 cc/min for about 2 minutes.
(f) The nitrogen flow rate was held constant at 800 cc/min. for about 15 minutes after the flow of oxygen had been shut off. The tube was then removed from the furnace.
(g) The tube was allowed to cool to room temperature after which time the nitrogen flow was turned off and the completed cathode removed from the tube.

The coat thickness of the cathode was measured to be 0.4 mg/cm$^2$ of $MoS_2$ and $MoO_2$. The presence of $MoO_2$ was noted by X-ray diffraction analysis. The atomic percentage of $MoO_2$ as a fraction of $MoS_2$ was estimated to lie in the 10%–20% range. Although other oxides of molybdenum may have been present, they were not revealed in the inventors' X-ray analysis.

A 1.7 cm$^2$ piece of the coated substrate so prepared was used as a cathode in a cell having a lithium foil anode separated from the cathode by a 20 micron thick porous polypropylene separator which had been soaked in a 0.7 M solution of LiBr in propylene carbonate. A stainless steel case provided mechanical rigidity as well as an oxygen and water-free environment. The completed cell was repeatedly discharged and charged several times at 400 microamperes.

EXAMPLE 2

A cathode was constructed by coating carbonized $MoS_2$ onto an aluminum foil strip measuring 2.5 cm $\times$ 10 cm $\times$ 20 microns as follows:
(a) The aluminum substrate was baked at 590° C. in a purified nitrogen atmosphere for about 20 minutes.
(b) After the foil cooled a suspension of 10% by weight $MoS_2$ in heavy lubricating oil was applied to the foil as a film. The average $MoS_2$ particle diameter was 0.25 microns. The foil substrate with applied film was placed on a quartz slab measuring 15 cm $\times$ 4 cm $\times$ 0.5 cm.
(c) The foil substrate with applied film and slab were placed in a quartz tube having a 2 inch diameter. Nitrogen was caused to flow through the tube at 400 cc/min. Oxygen was caused to flow through the tube at 0.2 cc/min.
(d) When the gas flow through the tube had stabilized, the tube was inserted in a furnace which had been preheated to 590° C.
(e) The oxygen flow was turned off about 5 minutes after the tube had been placed in the furnace. The nitrogen flow was held constant at 400 cc/min.
(f) The tube was removed from the furnace about 15 minutes after it was first placed in the furnace.
(g) The tube was allowed to cool to room temperature after which time the nitrogen flow was turned off and the completed cathode removed from the tube.

The coat thickness of the cathode was measured to be 0.5 mg/cm$^2$.

A 7 cm$^2$ piece of coated substrate was used as a cathode in a cell constructed in a manner similar to that of Example 1.

The completed cell exhibited a short circuit current in excess of 200 mA. The cell was repeatedly discharged and recharged several times with discharges corresponding to about 1 electron per $MoS_2$ molecule.

EXAMPLE 3

A cathode was prepared as described in Example 2, except that ten coats of carbonized $MoS_2$ were applied by repeating steps (b) through (g) ten times.

The coat thickness of the cathode was measured to be 4.0 mg/cm$^2$.

A 5 cm$^2$ piece of the coated substrate was used as a cathode in a cell constructed in a manner similar to that of Example 1.

Current densities of 1.5 mA/cm$^2$ at voltages less than 0.1 volts below the cell open circuit voltage were obtained with the cell so constructed. The cell was repeatedly discharged and charged over 100 times with discharges corresponding to about 0.6 electrons/$MoS_2$ molecule.

What is claimed is:
1. A method of manufacturing a predominantly transition metal chalcogenide cathode, comprising applying a suspension of finely divided transition metal chalcogenide particles in oil as a film on a selected substrate and then alternately baking the substrate and applied film in an oxygen-containing atmosphere and in an inert atmosphere.
2. The method of claim 1 wherein said substrate and applied film is first baked in an inert atmosphere to drive off substantially all of the oil and then further baked in an oxygen-containing atmosphere to oxidize a minor portion of the transition metal chalcogenide.

3. The method of claim 1 wherein said substrate and applied film is first baked in an oxygen-containing atmosphere to carbonize a minor portion of the oil and then further baked in an inert atmosphere to drive off substantially all of the oil.

4. The method of claim 1 wherein said substrate and applied film is first baked in an oxygen-containing atmosphere to oxidize a minor portion of the transition metal chalcogenide and to carbonize a minor portion of the oil and then further baked in an inert atmosphere to drive off substantially all of the oil.

5. The method of claim 1 wherein said transition metal chalcogenide is $MoS_2$.

6. The method of claim 5 wherein said substrate is selected from the group consisting of aluminum, stainless steel and nickel.

7. The method of claim 6 wherein said inert atmosphere is a gas selected from the group consisting of nitrogen, argon and helium.

8. The method of claim 7 wherein said particles have an average diameter of about 1 micron.

9. The method of claim 8 wherein said oil has a relatively high viscosity.

10. The method of claim 9 wherein about 5 mole percent to 50 mole percent of the transition metal chalcogenide is oxidized.

11. A predominantly transition metal chalcogenide cathode comprising
   a substrate, and
   a film of predominantly transition metal chalcogenide together with transition metal oxide formed on the substrate by baking in an inert atmosphere a suspension of finely divided transition metal chalcogenide particles in oil applied to the substrate thereby to drive off substantially all of the oil and further baking in an oxygen-containing atmosphere to oxidize at least a minor portion of the transition metal chalcogenide.

12. The cathode of claim 11 wherein said transition metal chalcogenide is $MoS_2$.

13. The cathode of claim 12 wherein said substrate is selected from the group consising of aluminum, stainless steel and nickel.

14. A predominantly transition metal chalcogenide cathode comprising
   a substrate, and
   a film of predominantly transition metal chalcogenide together with carbon formed on the substrate by baking in an oxygen-containing atmosphere a suspension of finely divided transition metal chalcogenide particles in oil and further baking in an inert atmosphere thereby to drive off substantially all of the oil.

15. The cathode of claim 14 wherein said transition metal chalcogenide is $MoS_2$.

16. The cathode of claim 15 wherein said substrate is selected from the group consisting of aluminum, stainless steel and nickel.

17. A predominantly transition metal chalcogenide cathode comprising
   a substrate, and
   a film of predominantly transition metal chalcogenide together with transition metal oxide and carbon formed on the substrate by baking in an oxygen-containing atmosphere a suspension of finely divided transition metal chalcogenide particles in oil and further baking in an inert atmosphere thereby to drive off substantially all of the oil.

18. The cathode of claim 17 wherein said transition metal chalcogenide is $MoS_2$.

19. The cathode of claim 18 wherein said substrate is selected from the group consisting of aluminum, stainless steel and nickel.

* * * * *